(12) United States Patent
Noh et al.

(10) Patent No.: US 7,869,146 B2
(45) Date of Patent: Jan. 11, 2011

(54) LENS MODULE

(75) Inventors: Jung Eun Noh, Gyunggi-do (KR); Sung Woon Dong, Gyunggi-do (KR); Yang Ho Moon, Gyunggi-do (KR); Dae Hyeong Lee, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/453,123

(22) Filed: Apr. 29, 2009

(65) Prior Publication Data

US 2010/0027137 A1 Feb. 4, 2010

(30) Foreign Application Priority Data

Aug. 4, 2008 (KR) .................. 10-2008-0076153

(51) Int. Cl.
*G02B 7/02* (2006.01)

(52) U.S. Cl. .................. 359/811; 359/819; 359/822

(58) Field of Classification Search ......... 359/694–701, 359/811–824

See application file for complete search history.

(56) References Cited

U.S. PATENT DOCUMENTS

| 7,573,657 B2 * | 8/2009 | Chiang ........................ 359/819 |
| 7,652,831 B2 * | 1/2010 | Watanabe ..................... 359/811 |
| 7,675,697 B2 * | 3/2010 | Chen ........................... 359/819 |
| 7,697,217 B2 * | 4/2010 | Funahashi et al. ........... 359/696 |

FOREIGN PATENT DOCUMENTS

KR 20-0391790 7/2005

* cited by examiner

*Primary Examiner*—Mohammed Hasan (57) ABSTRACT

A lens module includes a first lens, a second lens, a spacer, a seating part, and a protrusion part. The first lens includes a lens surface and a rib. The second lens is laminated on the first lens. The spacer maintains a predetermined interval between the first lens and the second lens. The seating part is disposed between the lens surface of the first lens and the rib and allows the spacer to be seated on the upper part of the first lens. The protrusion part includes a plurality of protrusions protruded from an undersurface of the spacer, which allow a height of the spacer seated on the seating part to change when the spacer is decentered.

13 Claims, 8 Drawing Sheets

LENS MODULE

CROSS-REFERENCE TO RELATED APPLICATIONS

This application claims the priority of Korean Patent Application No. 2008-76153 filed on Aug. 4, 2008, in the Korean Intellectual Property Office, the disclosure of which is incorporated herein by reference.

BACKGROUND OF THE INVENTION

1. Field of the Invention

The present invention relates to a lens module, and more particularly, to a lens module capable of easily performing position correction for an optical axis alignment because a decentered lens may be easily recognized without any shape deformation of laminated lenses.

2. Description of the Related Art

In a general lens module used in a mobile phone etc., lenses manufactured through an injection molding or processing are sequentially laminated in a barrel having a predetermined-sized internal space. A spacer is disposed between the lenses in order to maintain a predetermined distance between the lenses. The laminated lenses and the spacer are fixed using a press-fit ring.

Especially, an external diameter of the lens is manufactured so as to be smaller or greater than an inside diameter of the barrel because a processing error and a formation error may occur during manufacture of the lens and the barrel.

In this case, a size of a decenter from an optical axis is determined according to the tolerance relation between the lens and the barrel.

When the inside diameter of the barrel is greater than the external diameter of the lens, stress on the lens decreases while the size of the decenter between lenses increases.

On the contrary, when the inside diameter of the barrel is smaller than the external diameter of the lens, the lenses must be forcedly fitted into the barrel.

In this forcedly-fitting manner, there is a limitation in that the lens and the barrel are weak to a thermal deformation and a plastic deformation because the lens and the barrel are generally formed of a thermoplastic resin. Accordingly, the lenses may be deformed by heat and friction during the forcedly-fitting process although the size of the decenter decreases.

When a plurality of lenses are laminated, it is not easy to find which lens is decentered. This causes an optical axis correction to be substantially difficult, resulting in the defectiveness of the product.

Despite a recent tendency to require a high precision lens in order to face a high resolution pixel technology, a related art method of manufacturing a lens module has a limitation in that it is substantially impossible to manufacture a precision lens module.

SUMMARY OF THE INVENTION

An aspect of the present invention provides a lens module capable of easily performing location correction of a lens for an optical axis alignment because a decentered lens may be easily recognized without any shape deformation of laminated lenses.

According to an aspect of the present invention, there is provided a lens module including: a first lens including a lens surface and a rib; a second lens laminated on the first lens; a spacer maintaining a predetermined interval between the first lens and the second lens; a seating part between the lens surface of the first lens and the rib allowing the spacer to be seated on the upper part of the first lens; and a protrusion part including a plurality of protrusions protruded from an undersurface of the spacer, which allow a height of the spacer seated on the seating part to change when the spacer is decentered.

The protrusions of the protrusions part may have a different diameter centering on an optical axis from each other.

Heights of the protrusions of the protrusion part may increase in a direction from an optical axis to a circumferential surface.

The protrusions of the protrusion part may be continuously disposed spaced from the seating part by predetermined distances.

The seating part may be continuously disposed along an outer edge of the lens surface of the first lens, and have a predetermined stepped height from the rib.

The seating part may be downwardly declined in a direction from the lens surface to the rib.

The spacer may be incorporated with the second lens by extending along an optical axis from a circumferential surface of the second lens.

The spacer may be incorporated with the second lens by contacting an upper surface of the spacer with an undersurface of the second lens.

The upper surface of the spacer may be downwardly declined in a direction from the circumferential surface to the lens surface.

According to another aspect of the present invention, there is provided a lens module including: a first lens; a second lens laminated on the first lens; a spacer maintaining a predetermined interval between the first lens and the second lens; a seating part provided an undersurface of the spacer allowing the spacer to be seated on the upper part of the first lens; and a protrusion part including a plurality of protrusions protruded from a surface of a rib of the first lens, which allow a height of the spacer seated on the first lens to change when the spacer is decentered.

The protrusions of the protrusion part may have a different diameter centering on an optical axis from each other.

Heights of the protrusions of the protrusion part may increase in a direction from an optical axis to a circumferential surface.

The protrusions of the protrusion part may be continuously disposed spaced from a lens surface of the first lens by predetermined distances.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

First, a lens module according to an embodiment of the present invention will be described with reference to FIGS. 1 and 2.

Figure 1:
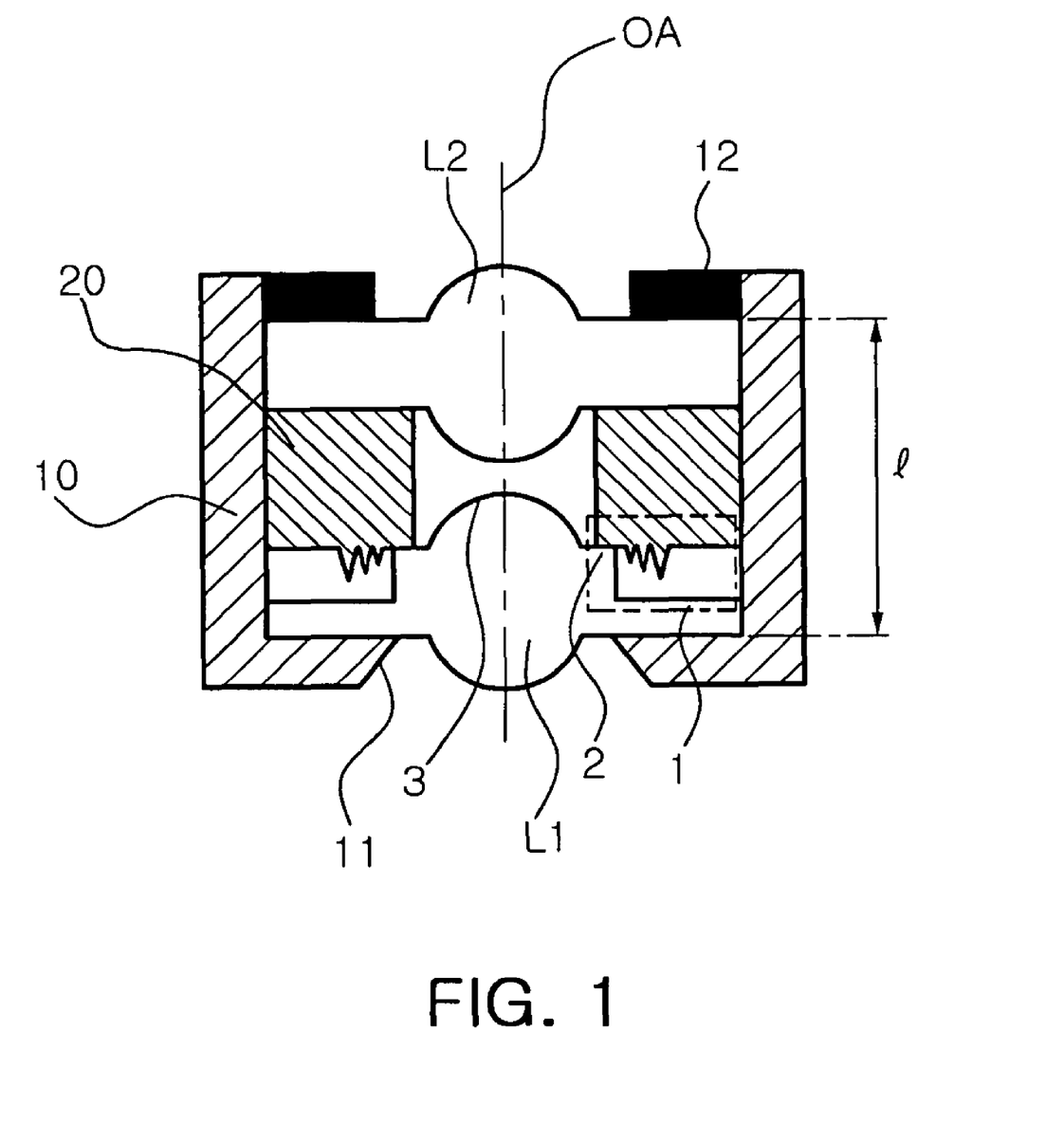
FIG. 1 is a sectional view illustrating a lens module according to an embodiment of the present invention.

FIG. 1 is a sectional view illustrating a lens module according to an embodiment of the present invention. FIG. 2 is a magnified sectional view illustrating a protrusion part in the lens module in FIG. 1.

Figure 2:
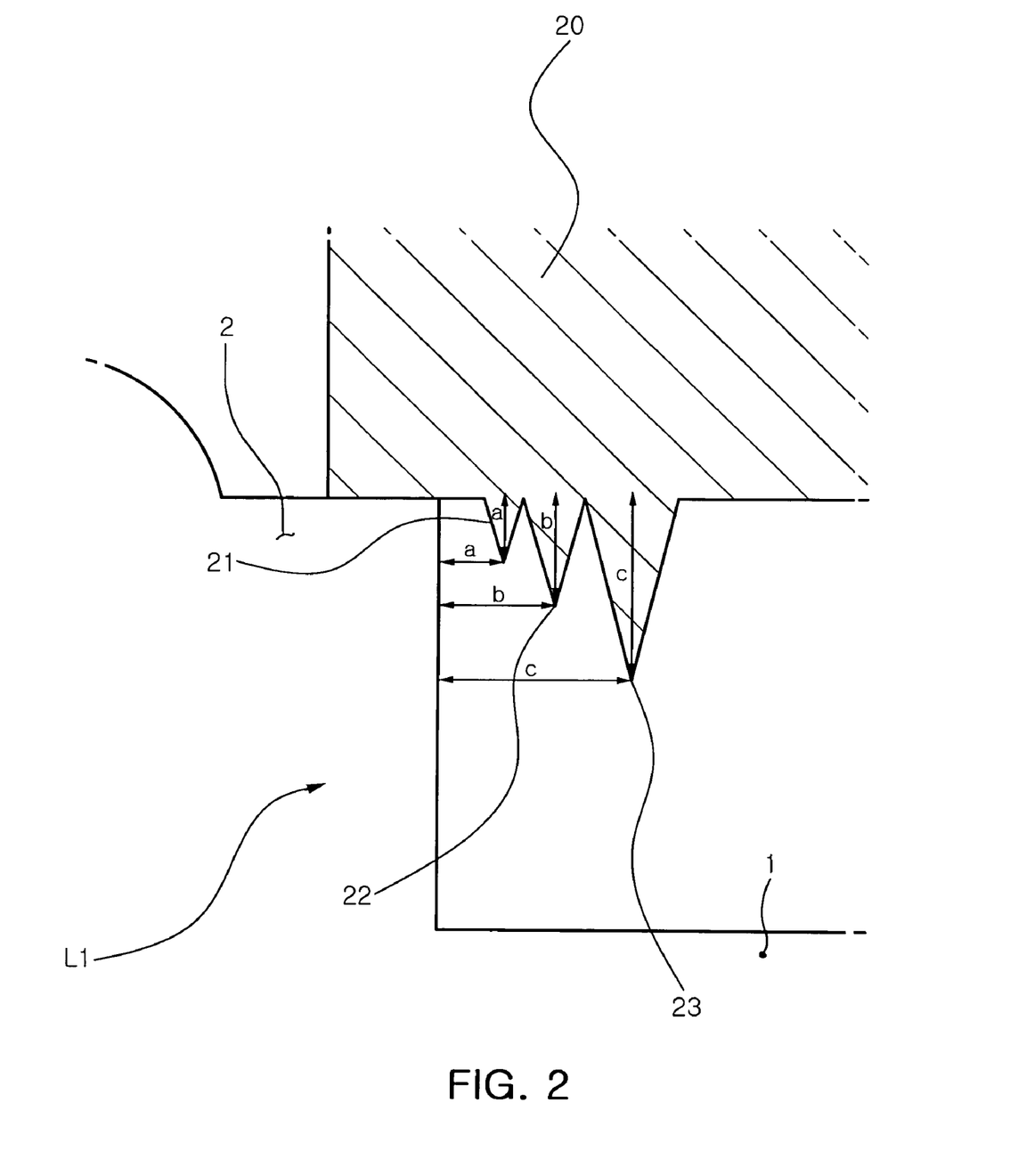
FIG. 2 is a magnified sectional view illustrating a protrusion part in the lens module in FIG. 1.

Referring to FIGS. 1 and 2, the lens module according to an embodiment of the present invention includes a lens barrel 10, first lens L1, a second lens L2 and a spacer 20, a seating part 2, a protrusion part 120, and a fixing ring 12.

The first lens L1 and the second lens L2 are plastic lenses manufactured in various forms by an injection molding, which has an advantage of increasing design flexibility.

The first lens L1 and the second lens L2 includes a lens surface 3 having a convex shape at a center thereof, and a rib 1 having a flat shape extending to the circumferential surface of the lens.

The seating part 2 is provided on the upper part of the first lens L1, between the lens surface 3 of the first lens L1 and the rib 1, so that the spacer 20 is seated on the seating part 2.

As described in FIG. 1, the seating part 2 is continuously provided along the outer edge of the lens surface 3 of the first lens L1, so that a predetermined step height exists between the seating part 2 and the rib 1.

Accordingly, the spacer 20 is laminated on the upper part of the first lens L1 so that the lower surface is contacted with the upper surface of the seating part 2 but not contacted with the rib 1.

The seating part 2 may be additionally formed through a separate process, or be simultaneously formed together with the lens surface 3 and the rib 1 upon the injection molding of the first lens L1.

As described above, the seating part 2 may be provided on the upper part of the first lens L1, but not limited thereto. The seating part 2 may be also provided on the upper part of the second lens L2.

The spacer 20 is disposed between the first lens L1 and the second lens L2 so as to maintain a predetermine distance between the first lens L1 and the second lens L2.

The spacer 20 includes a hole having a predetermined diameter so as to receive an incident light from a subject through a barrel hole 11.

The spacer 20 has a flat upper surface in order to contact with the lower surface of the second lens L2 which is laminated thereon.

The protrusion part 120 including a plurality of protrusions 21, 22 and 23 is formed on the undersurface of the spacer 20 so that the height of the spacer 20 may change when the spacer 20 is decentered from an optical axis during lamination on the seating part 2.

A shape and structure of the protrusion part 120 will be described in detail with reference to FIG. 2.

Referring to FIG. 2, the protrusion part 120 includes a first protrusion 21, a second protrusion 22, and a third protrusion 23, each of which is differently spaced from the optical axis at the center.

The protrusions 21, 22 and 23 of the protrusion part 120 are spaced from a stepped surface of the seating part 2 by predetermined distances, and continuously disposed along the seating part 2. That is, the protrusions 21, 22 and 23 are disposed in a ring shape along the stepped surface of the seating part 2.

The height of each of the protrusions 21, 22 and 23 progressively increases in a direction from the optical axis OA to the circumferential surface.

According to a preferred embodiment of the present invention, each of the protrusions 21, 22 and 23 has a height substantially identical to each distance from the seating part 2.

That is, the height of the first protrusion 21 is identical to the distance from the seating part 2. The height of the second protrusion 22 is identical to the distance from the seating part 2. The height of the third protrusion 23 is identical to the distance from the seating part 2.

According to an embodiment of the present invention, the spacer 20 is laminated on the upper part of the first lens L1 as a separate element similarly with the lenses. Then, the second lens L2 is laminated on the upper part of the spacer 20.

Without any limitation thereto, the spacer 20 may be secured to the undersurface of the second lens L2 using an adhesive.

Also, the spacer 20 may be incorporated with the second lens L2 by extending downwardly along the optical axis OA from the circumferential surface of the second lens L2.

The fixing ring 12 allows the lenses and spacer 20 not to escape from the lens barrel 10. The fixing ring 12 may be secured through a forcedly-fitting manner or a screw-tightening manner.

Hereinafter, a method of determining how distant the spacer 20 is decentered by using the protrusion part 120 will be described with reference to FIGS. 3A and 3B.

Figure 3A:
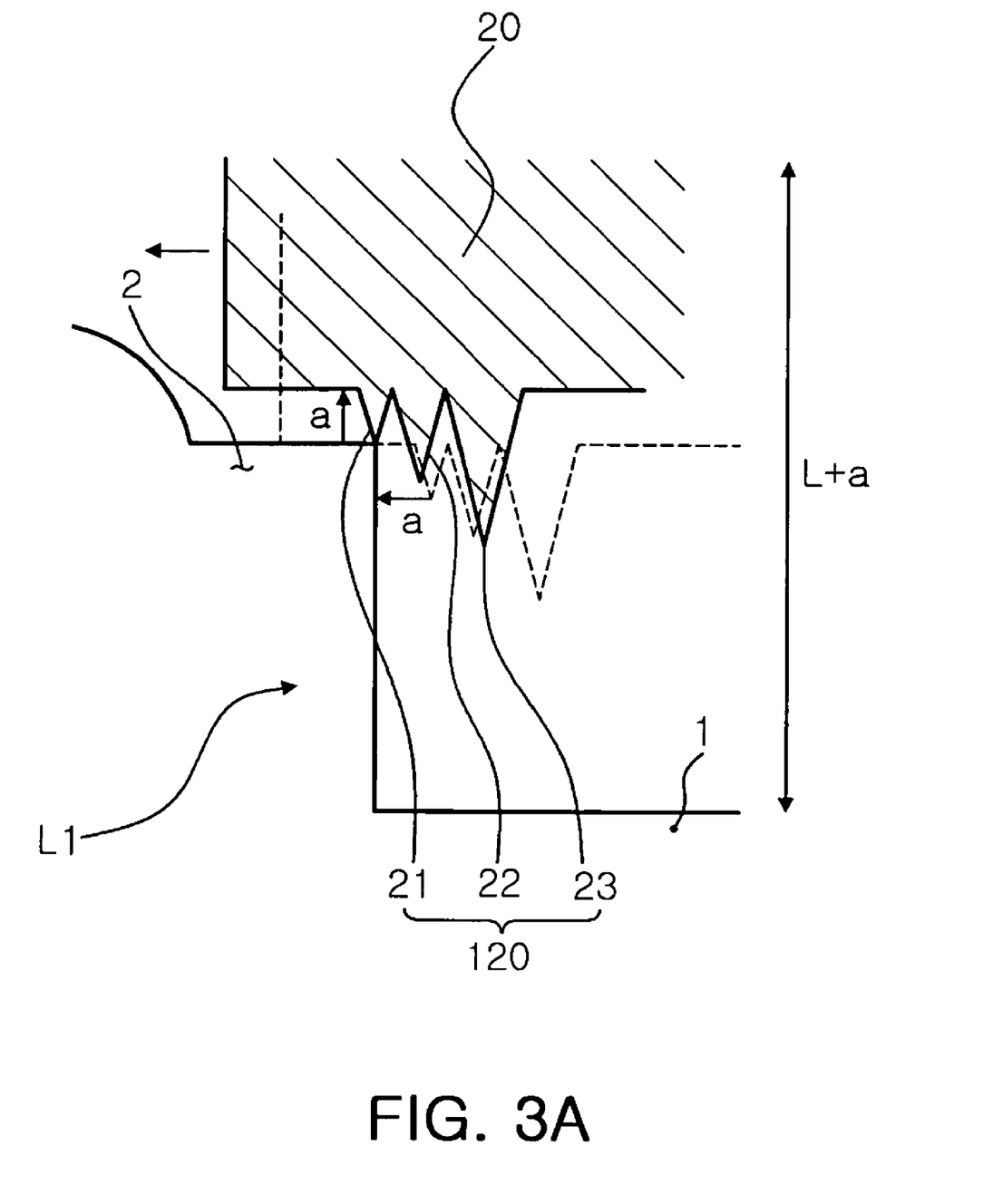
FIGS. 3A and 3B are a sectional view illustrating a decenter occurring in the lens module in FIG. 2.
Figure 3B:
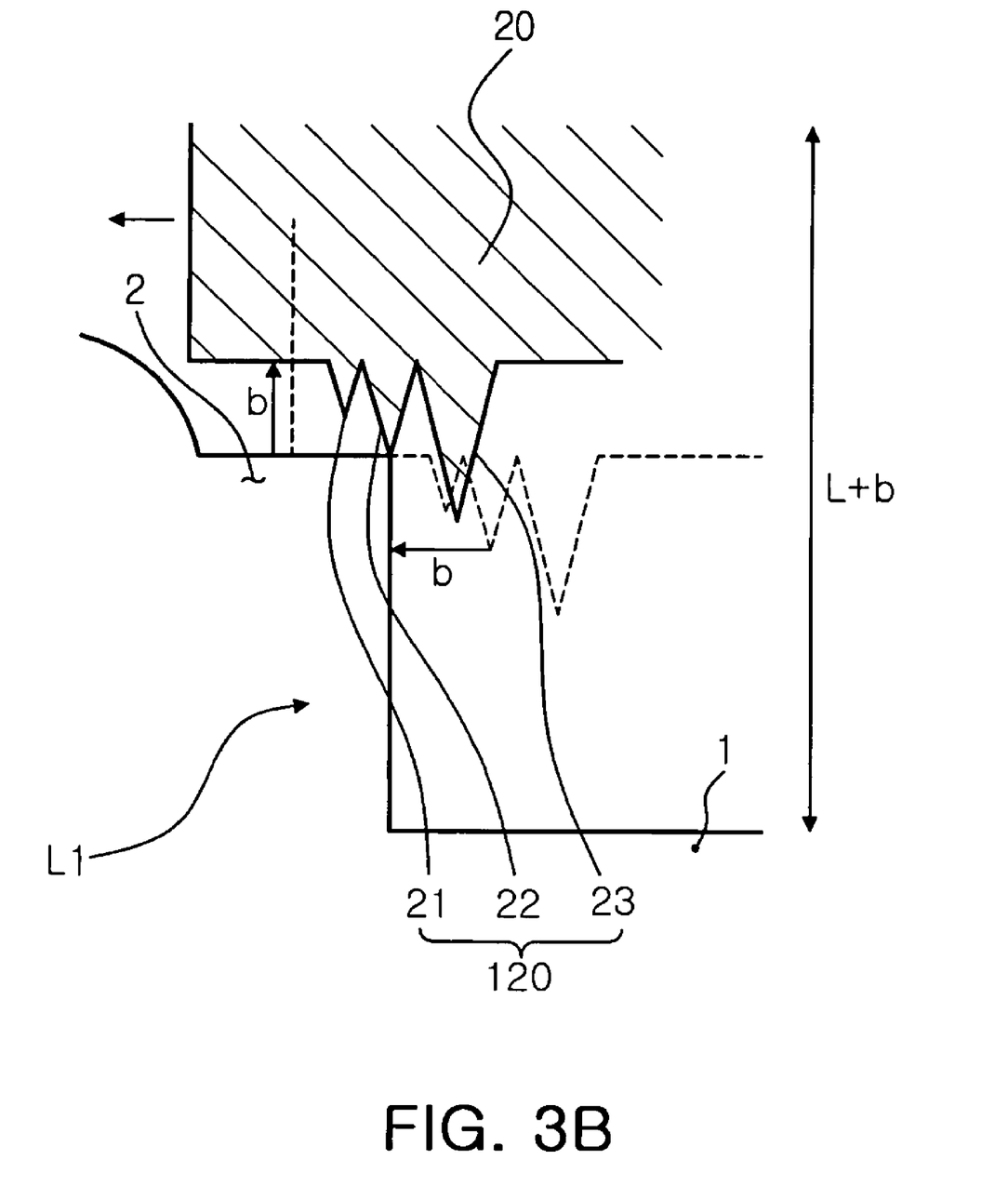

FIGS. 3A and 3B are a sectional view illustrating a decenter occurring in the lens module in FIG. 2.

When the decenter does not occur on the first lens L1, a spacer 20, and the second lens L2 laminated in the lens barrel 10, a length of the laminated body is L. The length may be predicted by measuring thicknesses of the lens and the spacer 20, respectively.

Referring to FIG. 3A, when the spacer 20 is decentered from the optical axis by a distance a (unit: μm), the first protrusion 21 is located on the seating part 2 so that the positions of the spacer 20 and the second lens L2 go up by the distance a.

Accordingly, the total length of the laminated body becomes L+a after the lamination. It may be easily determined that the spacer 20 and the second lens L2 are decentered from the optical axis by the distance a.

Referring to FIG. 3B, when the spacer 20 is decentered from the optical axis by a distance b (unit: μm), the second protrusion 22 is located on the seating part 2 so that the positions of the spacer 20 and the second lens L2 go up by the distance b.

Accordingly, the total length of the laminated body becomes L+b after the lamination. It may be recognized that the spacer 20 and the second lens L2 are decentered from the optical axis by the distance b.

Hereinafter, two or more lenses laminated in a lens module according to an embodiment of the present invention will be described with reference to FIGS. 4 and 5.

Figure 4:
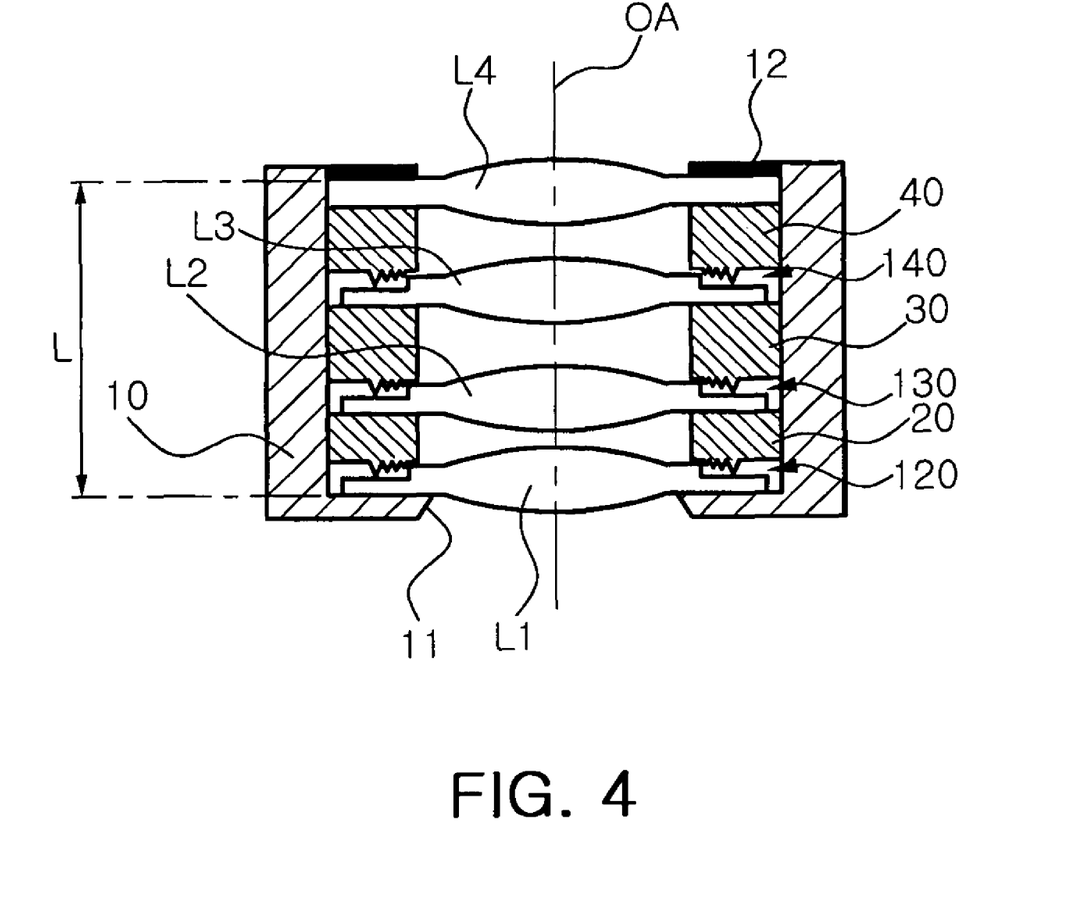
FIG. 4 is a sectional view illustrating a plurality of lenses laminated in the lens module in FIG. 1.

FIG. 4 is a sectional view illustrating a plurality of lenses laminated in the lens module in FIG. 1. FIG. 5 is a magnified sectional view illustrating a protrusion part in the lens module in FIG. 4.

Figure 5:
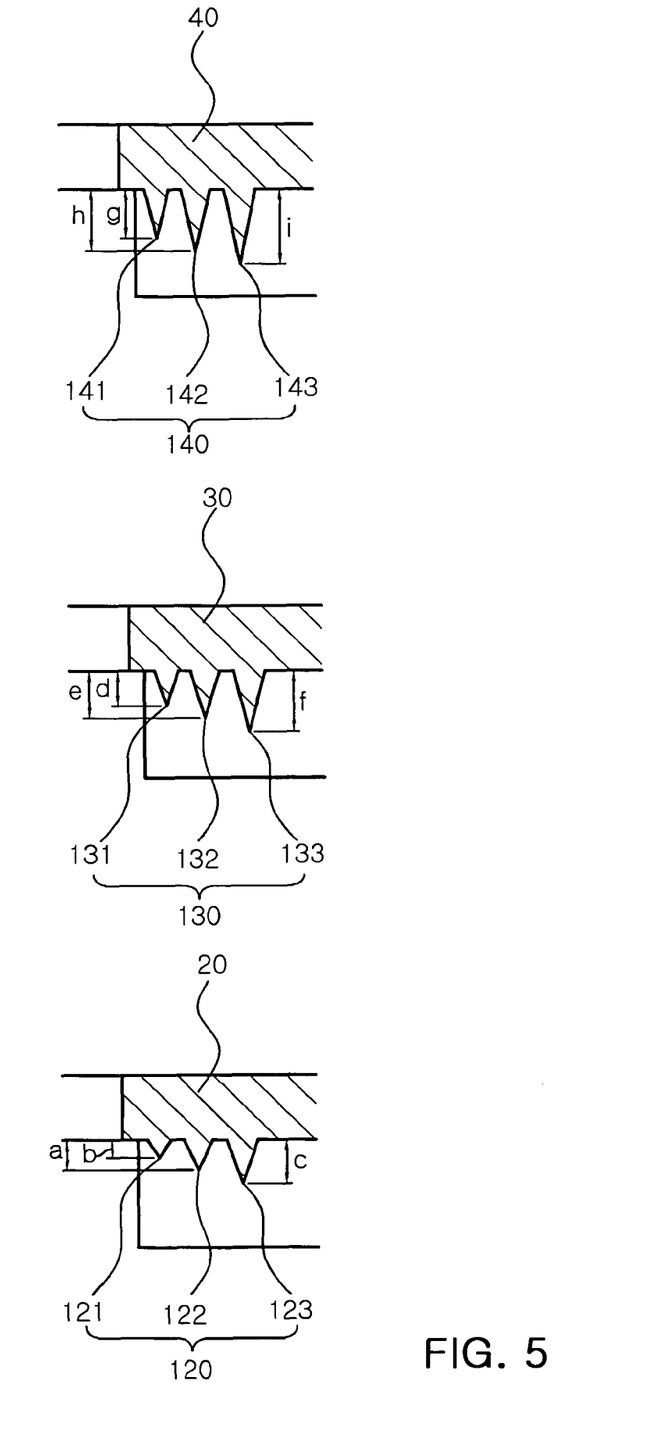
FIG. 5 is a magnified sectional view illustrating a protrusion part in the lens module in FIG. 4.

A structure of the lens module according to an embodiment described in FIGS. 4 and 5 is substantially identical to the structure of the lens module according to the embodiment described in FIGS. 1 and 2.

Detail description of the structures and elements identical to those in FIGS. 1 and 2 will be omitted below. Hereinafter, a structure and a function of a protrusion part will be mainly described because the protrusion part in FIGS. 4 and 5 is different from the protrusion part in FIGS. 1 and 2.

Referring to FIGS. 4 and 5, a lens module according to another embodiment of the present invention includes a first lens L1, a second lens L2, a third lens L3, and a fourth lens L4. Also, the lens module includes a first spacer 20, a second spacer 30, and a third spacer 40. The spacers 20, 30 and 40 are disposed between the lenses L1, L2, L3 and L4, respectively.

A general structure of a first protrusion part 120, a second protrusion part 130, a third protrusion part 140 protruded from the undersurfaces of first spacer 20, the second spacer 30, and the third spacer 40, respectively, are substantially identical to that of the protrusion part described in FIGS. 1 to 3.

That is, a first protrusion 121, a second protrusion 122, a third protrusion 123 of the first protrusion part 120 are disposed in a ring shape along a stepped surface of a seating part 2. The height of each of the protrusions 121, 122 and 123 progressively increases in a direction from the optical axis OA to the circumferential surface.

However, the lowest fourth protrusion 131 in the second protrusion part 130 is formed with such a structure that the lowest fourth protrusion 131 has a higher height than the tallest third protrusion 123 in the first protrusion part 120, and the lowest seventh protrusion 141 in the third protrusion part 140 is formed with such a structure that the lowest seventh protrusion 141 has a higher height than the tallest sixth protrusion 133 in the second protrusion part 130.

That is, each of the protrusions in the same protrusion parts has a step structure of increasing height toward the circumferential surface, and each of the protrusion parts has a step structure of increasing total height toward the upper surface.

A method of determining where a decenter occurs by using each protrusion part is identical to the method as described in FIG. 3

When a decenter does not occur in each lens and spacer laminated in a lens barrel 10, a length of the laminated body is L When the first spacer 20 is decentered from the optical axis OA by a distance c (unit: μm), the total length of the laminated body becomes L+c. It may be easily determined that the second lens L2 and the first spacer 20 are decentered from the optical axis.

When the second spacer 30 is decentered from the optical axis OA by a distance e, the total length of the laminated body becomes L+e. It may be easily determined that the third lens L3 and the second spacer 30 are decentered from the optical axis.

Accordingly, an optical axis alignment of the entire laminated body may be easily performed through a position correction of the corresponding lens and spacer because it is easily recognized where the decenter occurs.

Figure 6A:
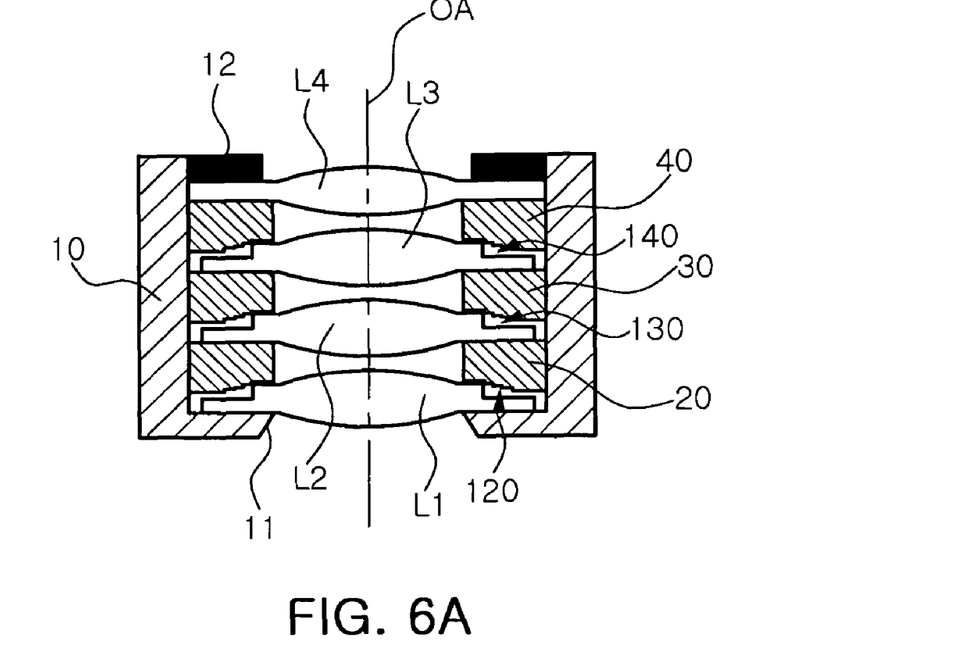
FIGS. 6A and 6B are a sectional view illustrating lens modules according to various embodiments of the present invention.
Figure 6B:
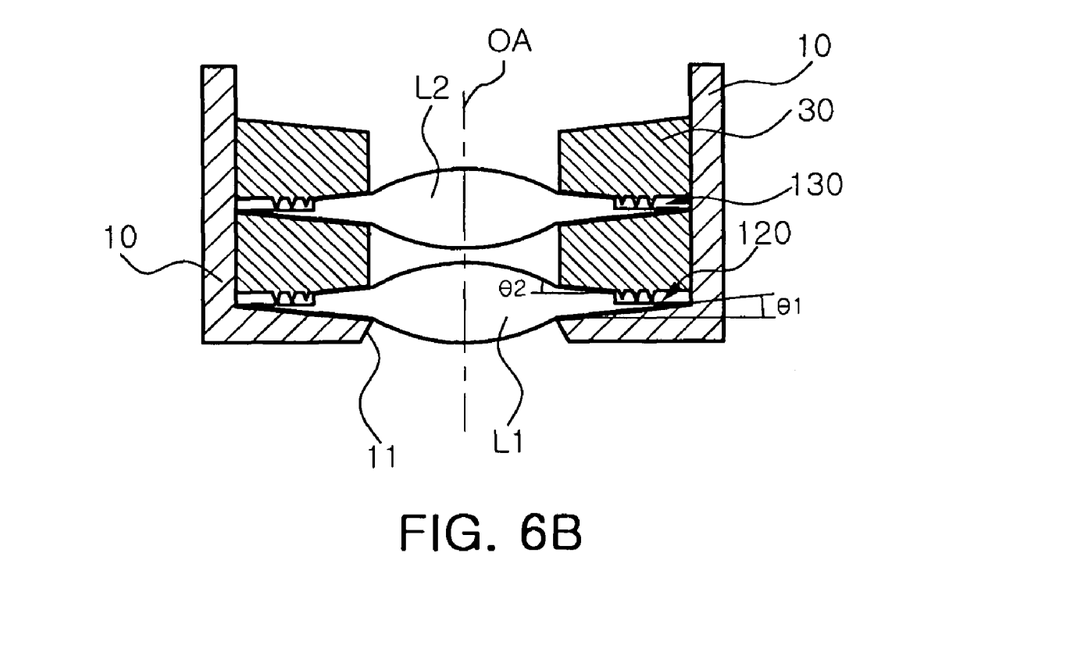

FIGS. 6A and 6B are a sectional view illustrating lens modules according to various embodiments of the present invention.

Referring to FIG. 6A, each of protrusion parts 120, 130 and 140 may have a step structure of increasing height toward the circumferential surface.

In this case, each of protrusion parts 120, 130 and 140 can be easily designed and manufactured due to their simple structure.

As described in FIG. 6B, the upper surface of the seating part 2 may be declined from the lens surface to the rib by a predetermined angle θ2. Also, the upper surface of the spacers 20 and 30 may be declined from the circumferential surface to the lens surface by a predetermined angle θ1.

On lamination, it is possible to reduce the possibility of the decenter because the seating surface and the undersurface of the lenses are declined.

A lens module according to another embodiment of the present invention will be described with reference to FIG. 7.

Figure 7:
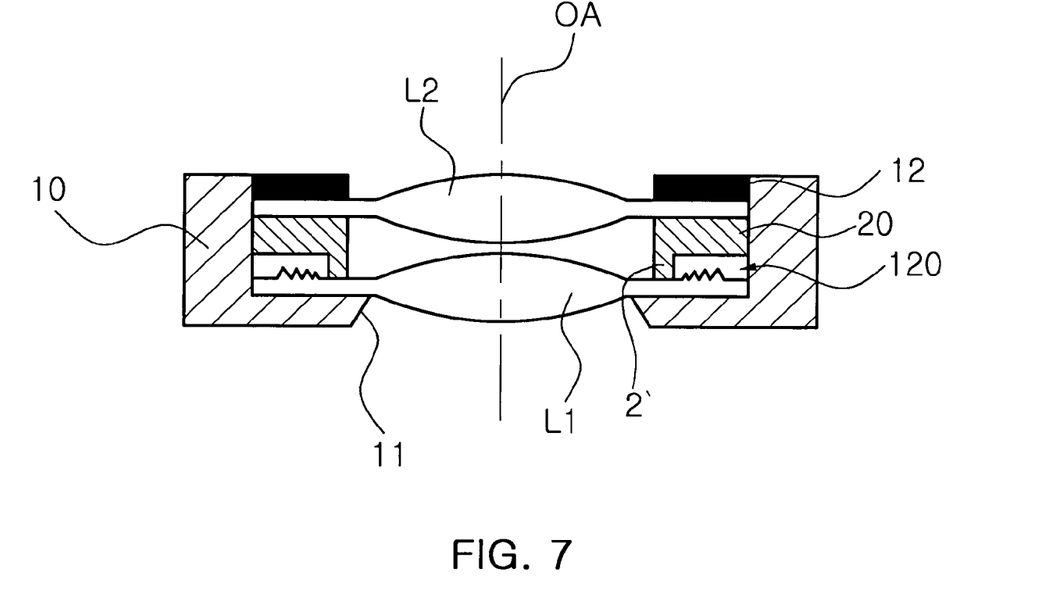
FIG. 7 is a sectional view illustrating a lens module according to another embodiment of the present invention.

FIG. 7 is a sectional view illustrating a lens module according to another embodiment of the present invention.

A structure of the lens module according to another embodiment is substantially identical to the structure of the lens module according to the embodiment described in FIGS. 1 and 2.

Detail description of the structures and elements identical to those in FIGS. 1 to 3 will be omitted below. Hereinafter, a structure and a function of a protrusion part will be mainly described because the protrusion part in FIG. 7 is different from the protrusion part in FIGS. 1 to 3.

Referring to FIG. 7, a lens module according to another embodiment of the present invention includes a first lens L1, a second lens L2, a spacer 20, a seating part 2', a protrusion 120, and a fixing ring 12.

The first lens L1 and the second lens L2 includes a lens surface 3 having a convex shape at a center thereof, and a rib 1 having a flat shape extending from the lens surface 3 to the circumferential surface of the lens.

A protrusion part 120 including a plurality of protrusions is protruded from a surface of the rib 1 of the first lens L1. The protrusion part 120 allows a height of the spacer 20 seated on the first lens L1 to change according to a decenter.

Centering on the optical axis OA, protrusions of the protrusion part 120 has a different diameter from each other. The protrusions of the protrusion part 120 are continuously disposed in a ring shape spaced from the lens surface 3 by predetermined distances.

Also, the heights of the protrusions of the protrusion part 120 increase in a direction from the optical axis to the circumferential surface.

The spacer 20 is disposed between the first lens L1 and the second lens L2. The spacer 20 includes a seating part 2' allowing the undersurface of the spacer 20 to be seated on the upper surface of the first lens L1.

The seating part 2' has a ring shape extending in an optical axis direction along the circumference of the hole provided at the center of the spacer 20.

The undersurface of the seating part 2' is seated on the surface of the rib 1 between the lens surface 3 of the first lens L1 and the protrusion part 120.

The lens modules according the exemplary embodiments to the present invention have an effect of enhancing operational reliability by facilitating a position correction of a lens for an optical axis alignment because a decentered lens may be easily recognized without a shape deformation of laminated lenses.

While the present invention has been shown and described in connection with the exemplary embodiments, it will be apparent to those skilled in the art that modifications and variations can be made without departing from the spirit and scope of the invention as defined by the appended claims.

What is claimed is:

1. A lens module comprising:
a first lens comprising a lens surface and a rib;
a second lens laminated on the first lens;
a spacer maintaining a predetermined interval between the first lens and the second lens;
a seating part between the lens surface of the first lens and the rib allowing the spacer to be seated on the upper part of the first lens; and
a protrusion part comprising a plurality of protrusions protruded from an undersurface of the spacer, which allow a height of the spacer seated on the seating part to change when the spacer is decentered, the protrusions being disposed along a circumference of the seating part.

2. The lens module of claim 1, wherein the protrusions of the protrusions part have a different diameter centering on an optical axis from each other.

3. The lens module of claim 1, wherein heights of the protrusions of the protrusion part increases in a direction from an optical axis to the circumferential surface of the seating part.

4. The lens module of claim 1, wherein the protrusions of the protrusion part are continuously disposed spaced from the seating part by predetermined distances.

5. The lens module of claim 1, wherein the seating part is continuously disposed along an outer edge of the first lens, and has a predetermined stepped height from the rib.

6. The lens module of claim 1, wherein the seating part is downwardly declined in a direction from the lens surface to the rib.

7. The lens module of claim 1, wherein the spacer is incorporated with the second lens by extending along an optical axis from a circumferential surface of the second lens.

8. The lens module of claim 1, wherein the spacer is incorporated with the second lens by contacting an upper surface of the spacer with an undersurface of the second lens.

9. The lens module of claim 8, wherein the upper surface of the spacer is downwardly declined in a direction from the circumferential surface of the second lens to the lens surface.

10. A lens module comprising:
a first lens;
a second lens laminated on the first lens;
a spacer maintaining a predetermined interval between the first lens and the second lens;
a seating part provided an undersurface of the spacer allowing the spacer to be seated on the upper part of the first lens; and
a protrusion part comprising a plurality of protrusions protruded from a surface of a rib, which allow a height of the spacer seated on the first lens to change when the spacer is decentered, the protrusions being disposed along a circumference of the seating part.

11. The lens module of claim 10, wherein the protrusions of the protrusions part have a different diameter centering on an optical axis from each other.

12. The lens module of claim 10, wherein heights of the protrusions of the protrusion part increases in a direction from an optical axis to a the circumferential surface of the seating part.

13. The lens module of claim 10, wherein the protrusions of the protrusion part are continuously disposed spaced from a lens surface of the first lens by predetermined distances.

* * * * *

UNITED STATES PATENT AND TRADEMARK OFFICE
CERTIFICATE OF CORRECTION

PATENT NO. : 7,869,146 B2
APPLICATION NO. : 12/453123
DATED : January 11, 2011
INVENTOR(S) : Jung Eun Noh et al.

It is certified that error appears in the above-identified patent and that said Letters Patent is hereby corrected as shown below:

Column 8, Line 27, In Claim 12, delete "a the" and insert --the--, therefor.

Signed and Sealed this
Fourteenth Day of June, 2011

David J. Kappos
*Director of the United States Patent and Trademark Office*